United States Patent [19]

Parikh

[11] Patent Number: 5,348,256
[45] Date of Patent: Sep. 20, 1994

[54] SUPERSONIC AIRCRAFT AND METHOD

[75] Inventor: Pradip G. Parikh, Renton, Wash.

[73] Assignee: The Boeing Company, Seattle, Wash.

[21] Appl. No.: 883,590

[22] Filed: May 13, 1992

[51] Int. Cl.$^5$ .................. B64C 21/06; B64C 21/04
[52] U.S. Cl. .................... 244/208; 244/204; 244/209; 244/35 A
[58] Field of Search ............ 244/200, 204, 207, 208, 244/209, 35 R, 35 A, 134 C, 1 N

[56] References Cited

U.S. PATENT DOCUMENTS

| | | | |
|---|---|---|---|
| 1,829,616 | 10/1931 | Stalker | 244/208 |
| 3,093,350 | 6/1963 | Wilkins | 244/207 |
| 3,100,094 | 8/1963 | Griswold, II | 244/207 |
| 3,142,457 | 7/1964 | Quenler | 244/207 |
| 3,310,262 | 3/1967 | Robins et al. | 244/45 R |
| 3,317,162 | 5/1967 | Grant | 244/209 |
| 3,441,236 | 4/1969 | Arnholdt | 244/204 |
| 3,776,489 | 12/1973 | Wen et al. | 244/1 N |
| 3,904,151 | 9/1975 | Rethorst | 244/207 |
| 3,917,193 | 11/1975 | Runnels, Jr. | 244/207 |
| 4,161,300 | 7/1979 | Schwaerzler et al. | 244/90 R |
| 4,168,044 | 9/1979 | Rethorst | 244/1 N |
| 5,094,411 | 3/1992 | Rao | 244/90 R |
| 5,114,100 | 5/1992 | Rudolph et al. | 244/130 |

OTHER PUBLICATIONS

"Fifty Years of Laminar Flow Flight Testing" by R. D. Wagner, D. V. Maddaion & D. W. Bartlett, publication No. 881393 NASA Langley Research Center.

"Application of Boundary Layer Control to HSCT Low Speed Configuration" by P. G. Parikh for AIAA-.AHS/ASEE Aircraft Design, Systems & Operation Conference=Sep. 17-19, 1990.

Primary Examiner—Michael S. Huppert
Assistant Examiner—Virna Lissi Ansley
Attorney, Agent, or Firm—Hughes & Multer

[57] ABSTRACT

A supersonic aircraft having highly swept subsonic leading edge portions of the wings provided with boundary layer control suction slots. When the airplane is operating at high angles of attack under circumstances where noise is objectionable, air is drawn in through the suction strips to alleviate separated air flow and substantially eliminate (or at least alleviate) vortices that would otherwise develop over the upper wing surface. This improves the L/D ratio and permits the engines to be at a lower power setting, thus alleviating noise. There are shown a double delta planform configuration, and an arrow plan form configuration. Also, the boundary layer control suction can be used in conjunction with laminar flow control suction.

25 Claims, 9 Drawing Sheets

SUPERSONIC AIRCRAFT AND METHOD

BACKGROUND OF THE INVENTION

1. Field of the Invention

The present invention relates to a supersonic aircraft and method of operating the same, and more particularly to such an apparatus and method incorporating suction boundary layer control (and in some instances laminar flow control) in the wings of the aircraft.

2. Background Art

There are number of challenges in the design of supersonic aircraft that will meet performance requirements and yet be environmentally acceptable relative to community noise generation. For achievement of improved supersonic cruise efficiency, a preferred supersonic aircraft configuration employs highly swept (subsonic) leading edge wings. However, this design creates particular problems relative to high lift conditions typical of climb-out and approach where high angles of attack are required. More particularly, these highly swept wings develop two leading edge vortices which, while increasing lift, also result in an increase in drag, resulting in a poor lift to drag (L/D) ratio. Higher (L/D) ratio is obtained when there is fully attached flow over the wings.

In the Concorde supersonic transport, the wing has a highly swept leading edge, but no leading edge devices are used. During takeoff and climb, the configuration operates at a high angle of attack, and the two strong vortices that are generated off of the leading edges create sufficient lift for takeoff and climb. However, because of the high drag, the engines are operated at a relatively high power setting, thus creating noise well above the maximum level permitted in the vicinity of most all airports. Consequently, there are very few airports at which the Concorde can operate. Significant research effort has been directed at improving the L/D ratio of supersonic aircraft during takeoff and climb.

One prior art approach to obtain good high lift (L/D) performance is to employ leading edge devices such as flaps or slats, in order to maintain nearly attached flow. However, this approach is mechanically complex and may still lead to hinge line separation. Further, this requires additional hardware, and also the systems to operate the same, thus creating a penalty in both weight and cost. Additionally the space requirement for the accommodation of leading edge devices reduces the available fuel volume in the leading edge region of the wings.

A concept which has been proposed to generate increased left at liftoff and approach (desirably in combination with leading edge slats or other leading edge devices) is to utilize vortex generators in the form of apex fences located at the more forward inboard leading edge portions of the two wings. In this instance, during takeoff and initial climb, these fences are raised to generate two strong vortices that sweep over the inboard upper surfaces of the two wings to create increased lift during takeoff and initial climb. The drag created, however, requires a somewhat higher power setting for the engines (thus creating greater noise). As climb continues, these fences are moved to the stowed position to decrease drag so that the engine can operate at a lower power setting to decrease noise.

The subject of laminar flow control has been studied for a number of decades, and these studies have been reviewed in a recent publication, entitled "Fifty Years of Laminar Flow Flight Testing" authored by R. D. Wagner, D. V. Maddaion, and D. W. Bartlett, publication No. 881393 at the NASA Langley Research Center. There is discussed natural laminar flow (NLF) and also laminar flow control (LFC) which uses suction at the surface. Also discussed is HLFC (Hybrid Laminar Flow Control) which is said to be a ". . . flow control concept that integrates LFC and NLF and avoids the objectionable characteristics of each." Suction is applied at a forward location to obtain the LFC, and immediately aft of the LFC section natural laminar flow (NLF) exists. There have been proposals to incorporate a suction system for supersonic aircraft for cruise laminar flow control.

In a publication entitled "Application of Boundary Layer Control to HSCT Low Speed Configuration", AIAA/AHS/ASEE Aircraft Design, Systems and Operation Conference, Sep. 17–19, 1990/ Dayton, Ohio (one of the authors of this paper being P. H. Parikh, the inventor herein), there is discussed the feasibility of using boundary layer control (BLC) on a high speed civil transport (HSCT) high lift configuration for low speed performance improvement. This is shown as being incorporated in a supersonic aircraft having a double delta wing configuration where there is a highly swept (subsonic) forward inboard wing portion and a less swept (supersonic) outer rear leading edge wing portion. Leading edge flaps (specifically droop nose flaps) are provided on the outboard less swept leading edge wing portion. Laminar flow control suction areas are provided along the leading edge of the more swept inboard wing portions and laminar flow control suction areas are provided on the outboard wing portions in areas aft of the flap hinge lines. These LFC areas are provided to decrease drag during supersonic cruise.

As illustrated in FIG. 2 of this same article, boundary layer control suction is applied at location immediately aft of the hinge line of the droop nose flap, this being done to avoid separation of the air that flows upwardly and rearwardly over the upper surface of the flap and then travels in a curve to flow over the upper wing surface. Thus, this configuration employs a leading edge flap/BLC combination to avoid (or at least alleviate) the separated flow that would otherwise occur aft of the flap in certain situations.

SUMMARY OF THE INVENTION

The supersonic aircraft of the present invention comprises an airfoil having a highly swept subsonic leading edge portion which is arranged to develop at high angles of attack separated flow that develops into a vortex that travels over an upper surface of the airfoil.

This leading edge portion has at its outer surface a boundary layer control suction strip means extending along the leading edge portion. There is also provided suction means to draw in outside air through the suction strip means.

The suction means is arranged, and also the suction strip means is positioned, configured and arranged, in a manner that operation of the suction means to draw in the outside air through the suction strip means alleviates the separated air flow so as to alleviate developing of the vortex.

In the preferred form, the outer surface of the leading edge portion is substantially fixed. Further, the preferred location of the suction strip means is adjacent to a leading edge highlight area of the airfoil.

In one embodiment, the airfoil also has a second less swept supersonic leading edge portion. Specifically, in this embodiment the aircraft has a planform double delta configuration where the highly swept subsonic leading edge portion is at a more forward inboard location, and the less swept supersonic leading edge portion is at a rear more outboard location. Also in this specific embodiment, the less swept supersonic leading edge portion has mechanically operable high lift device means to at least partially alleviate separated flow at high angles of attack.

In another embodiment, the highly swept leading edge portion extends substantially along an entire leading edge of the airfoil in a planform arrow configuration.

In yet another embodiment, there is additionally provided laminar flow control suction strip means located on a surface area of the airfoil. The suction means is arranged to draw in outside air also through the laminar flow control suction strip means. In a specific configuration, the laminar flow control suction strip means is located adjacent to and rearwardly of the boundary layer control suction strip means.

Also in this additional embodiment, the suction means is arranged to operate in a boundary layer control mode to draw in sufficient outside air through the boundary layer control suction strip means to alleviate the separated flow, and also to operate in a laminar flow control mode and draw in outside air through both of said boundary layer control suction strip means and through said laminar flow control suction strip means at a flow rate to effect laminar flow control by both said boundary layer control suction strip means and the laminar flow control suction strip means.

Also, in one preferred embodiment, there is transpiration anti-icing strip means positioned adjacent to the boundary layer control suction strip means in a manner that anti-icing air blown outwardly through the transpiration anti-icing strip means blows over at least the boundary layer control suction strip means for anti-icing thereof. Further, the suction means includes means to draw in outside air through the transpiration anti-icing strip means, and there is also anti-icing means to deliver anti-icing air to said transpiration anti-icing strip means. Also, in a specific configuration there is a second laminar flow control suction strip means located rearwardly of the transpiration anti-icing strip means. The suction means further comprises means to draw outside air through the second laminar flow control suction strip means.

In the preferred design, the boundary layer control strip means has a width dimension at at least one region of the highly swept subsonic leading edge portion taken along a line parallel to free stream flow relative to the aircraft, and this width dimension is no greater than about five percent of a chord length of said airfoil. More specifically, the width dimension is between about one percent to five percent of the chord length, and yet more specifically in a preferred form is between one percent to two percent of the chord length.

In the method of the present invention, the arrangement of the aircraft is provided as described above. During operating modes where the aircraft is at a high angle of attack, and where it is desired to obtain an improved lift over drag ratio so as to enable the engines to operate at a relatively lower power setting (to alleviate creating noise), the suction means is operated to alleviate the separated flow along the highly swept leading edge and improve the lift to drag ratio.

Also, in the method of the present invention, in an operating mode at liftoff and initial climb where generating noise is less critical, the aircraft is operated at a high angle of attack, but without operating the suction means (or at most operating the suction means at a low level), so that a vortex is generated over the highly swept leading edge. This vortex generates lift, but also results in increased drag, which requires the higher engine setting. As the aircraft continues through climbout and reaches an altitude where generating noise is more of a problem, then the suction means is operated to alleviate the formation of the vortex so that the engines are able to operate at a lower power setting so as to generate relatively less noise.

In the embodiment where laminar flow control suction is employed, during liftoff and at least initial climb, the laminar flow control suction means is not used. However, during operating modes where laminar flow control is of benefit (e.g. specifically at supersonic cruise and possibly other modes), the laminar flow control suction means is operated to diminish drag and improve performance.

The operation of the transpiration anti-icing strip means is such that hot de-icing air is blown outwardly through the anti-icing strip means during an anti-icing mode of operation. In addition, during an operating mode when laminar flow control is desired, the suction means can be utilized to draw in air through the anti-icing strip means to effect laminar flow control.

Other features will become apparent from the following detailed description.

BRIEF DESCRIPTION OF THE PREFERRED EMBODIMENT

Figure 1:
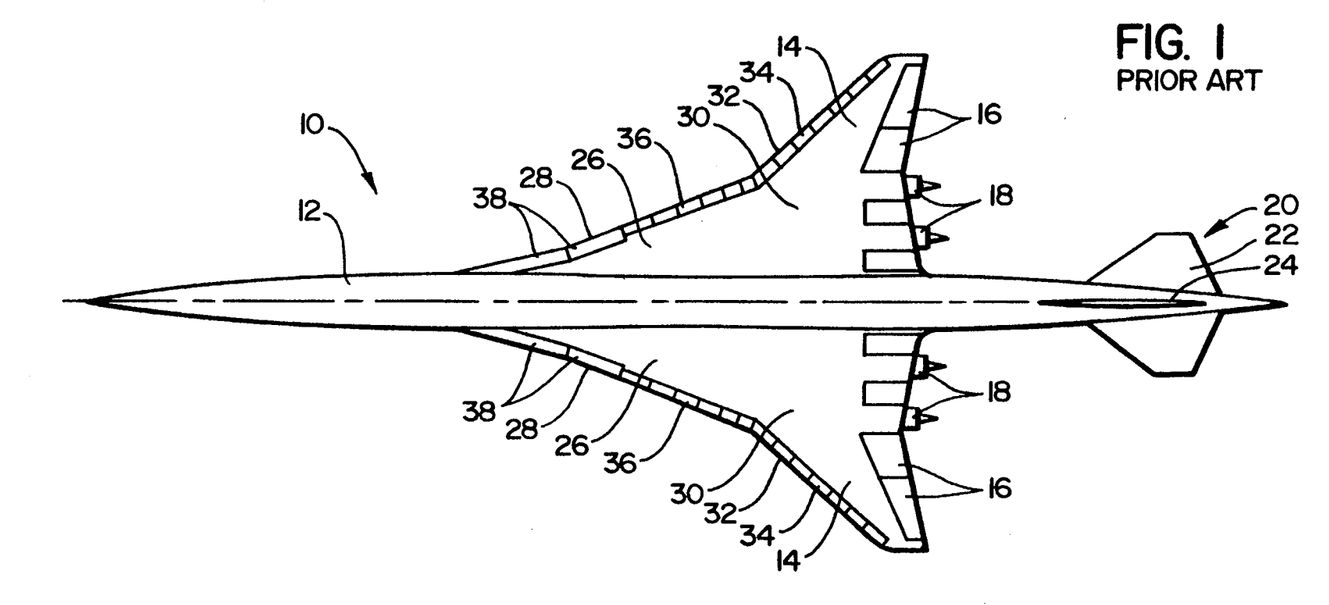
FIG. 1 is a top plan view of a prior art supersonic airplane having a reasonably optimized present day design.

In FIG. 1, to illustrate various elements of the prior art there is shown in top plan view a proposed supersonic transport incorporating various concepts proposed in the prior art for the leading edges of the wings. This airplane 10 comprises a fuselage 12 and right and left wings 14. At the aft end of the wings 14 there are trailing edge flaps 16, and four engines 18 are mounted on the underside of the wing near the trailing edge on opposite sides of the fuselage. There is a tail assembly 20 comprising the horizontal tail surface 22 and the vertical fin 24.

The wings 14 are of the double delta configuration, where there is a forward highly swept wing portion 26 having a highly swept (subsonic) leading edge at an inboard location, and also an outboard wing portion 30 having a more moderately swept (supersonic) leading edge 32. In this particular airplane 10, there are leading edge devices 34 along the aft less swept leading edge portions 32, and these leading edge devices can be, for example, droop nose leading edge flaps. The more highly swept inboard leading edge 28 has over the rear portion thereof leading edge slats 36. Forward of the leading edge slats 36 there are provided apex fences 38 (these being described previously under the section "Background of the Invention".)

In an optimized design, the inboard highly swept leading edges 28 have rounded cross-sectional configuration, with a minimum radius at the leading edge of between, for example, one to two inches in a section line taken parallel to the free stream line. Such a highly swept leading edge is called a "subsonic" leading edge since the flow component taken perpendicular to the leading edge at cruise is subsonic. On the other hand, the leading edges 32 of the two outboard wing portions 30 are supersonic leading edges (meaning that the flow component perpendicular to the leading edge 32 at cruise is supersonic), and the radius of curvature at the leading edge 32 is made as small as possible (i.e. a very small fraction of an inch). During cruise, the fences 38 and the leading edge devices 36 and 34 are all fully retracted and in their aerodynamically clean configuration.

A typical mode of operation during takeoff and climb of this aircraft 10 would be as follows. During takeoff, the leading edge slats or flaps 34 and 36 are fully retracted for increased lift, and the apex fences 38 are swung upward to create two strong vortices that sweep up over the upper surface of inboard portions of the wings 14. As discussed previously herein, in configuration with highly swept wing planform, these vortices are of sufficient strength so that they create adequate lift for take-off and climb. However (and also as discussed previously herein), these vortices do create a relatively high amount of drag. Accordingly, the engines 18 must be set at a relatively high power setting to carry the plane through liftoff and initial climb. Shortly after liftoff, the apex fences 38 would be moved to their stowed position and the leading edge slats 36 and flaps 34 would be deployed to improve the L/D ratio of the climbout configuration. The transition from the liftoff configuration to climbout configuration would be completed by the time the airplane 10 reaches an altitude of approximately 700 feet at which point community noise impact becomes an issue.

With the foregoing being presented as background information, attention will now be directed to a description of the first embodiment of the present invention with reference to FIGS. 2 through 5.

Figures 2, 3:
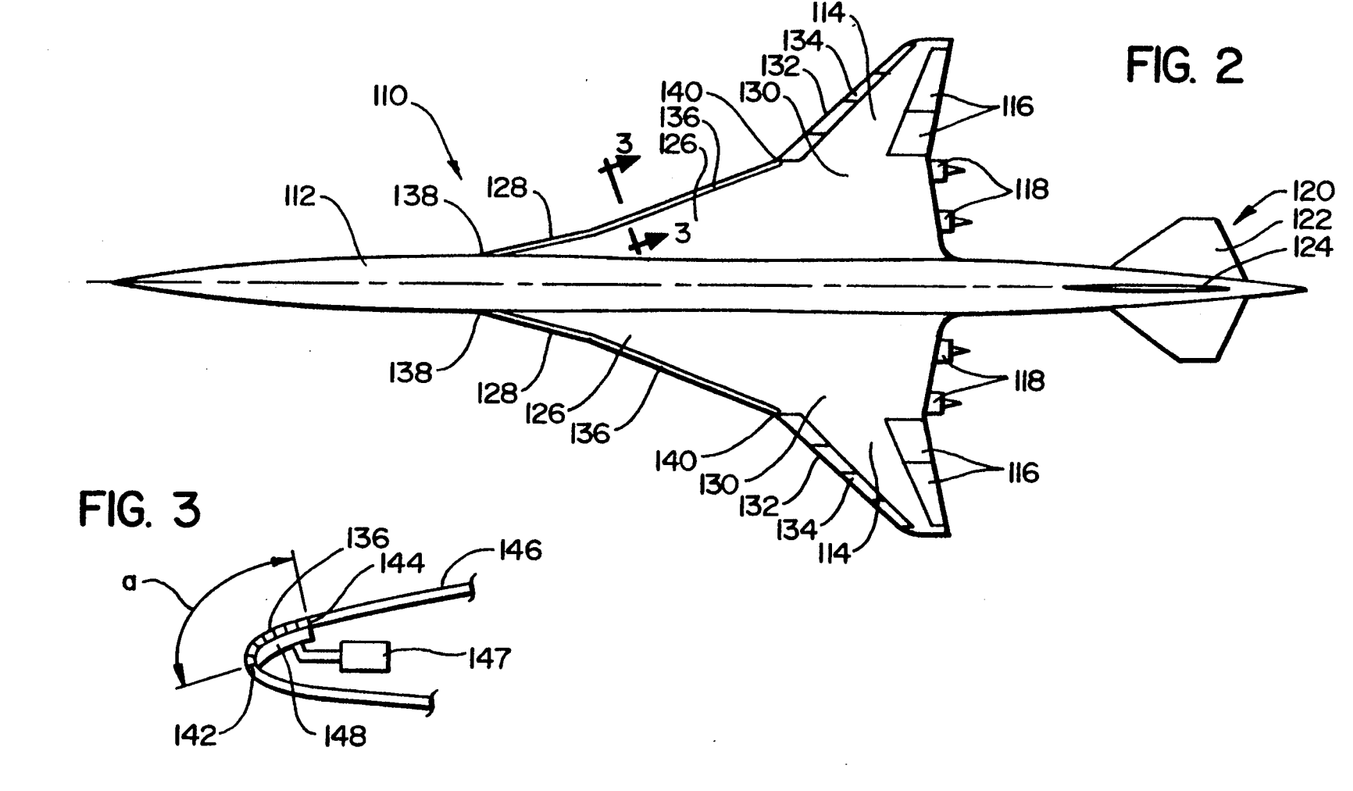
FIG. 2 is a top plan view of a supersonic airplane similar to that of FIG. 1, but incorporating the teachings of the present invention.
FIG. 3—3 is a sectional view taken perpendicular to the leading edge at line 3—3 of FIG. 2.
Figure 4:
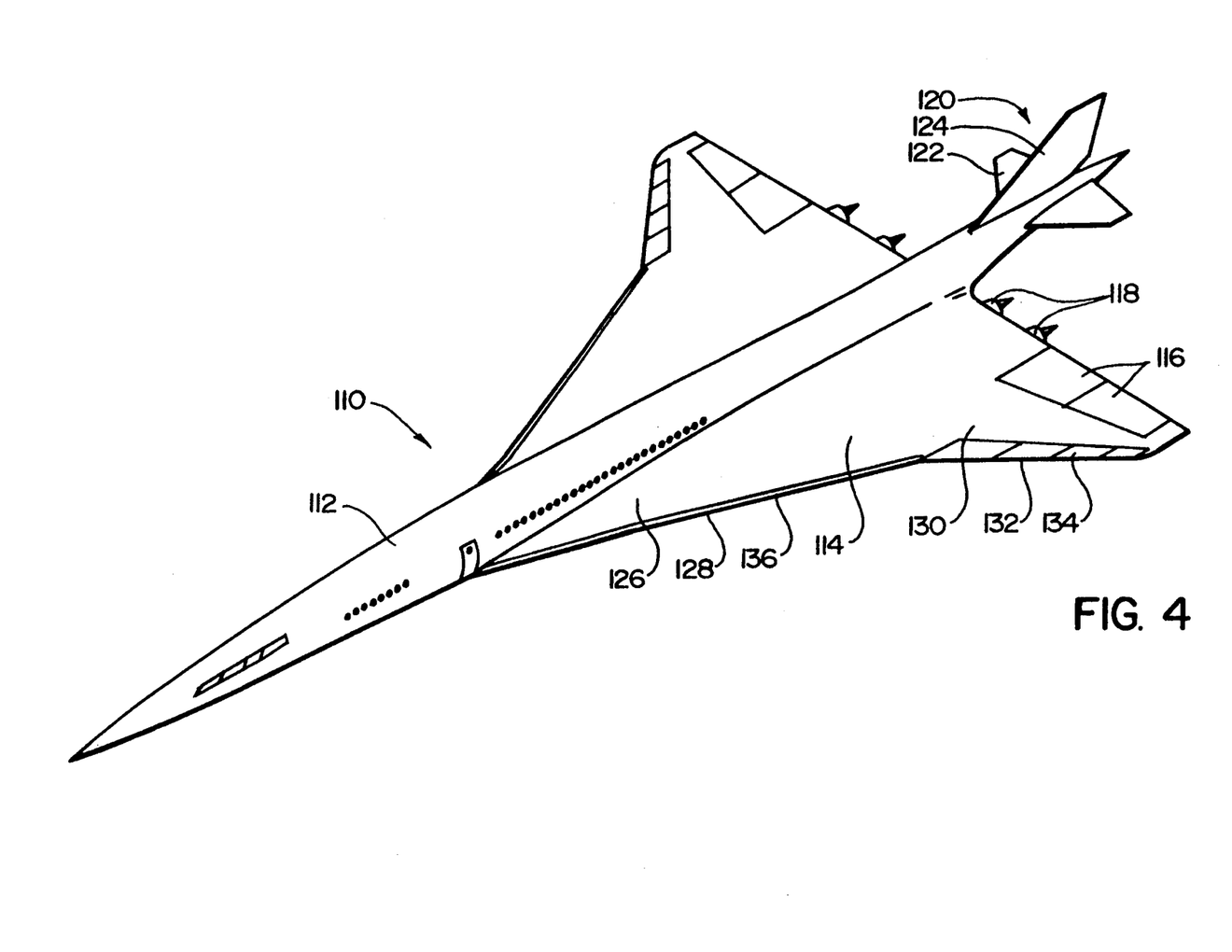
FIG. 4 is an isometric view of the airplane of the first embodiment of the present invention shown in FIG. 2.

With reference to FIG. 2 (which is a top plan form view as is FIG. 1), it can be seen that the first embodiment 110 is similar in some respects to the aircraft of FIG. 1 in that the aircraft 110 of this first embodiment comprises a fuselage 112, double delta wings 114, trailing edge flaps 116, engines 118, and a tail assembly 120 (this tail assembly 120 comprising the horizontal tail section 122 and a vertical fin 124). Also, as in the prior art airplane of FIG. 1, there is the inboard highly swept (subsonic) wing section 126, having leading edges 128 of a greater radius of curvature (e.g. one to two inches as measured along a section line parallel to the free stream line), and also the outboard less swept (supersonic) wing sections 130 having less swept leading edges 132 of much smaller radius of curvature. In a preferred form of this first embodiment, with the aircraft designed to cruise at Mach 2.4, the sweep angle of the inboard highly swept leading edge 128 is about 73°. It is apparent, however, that the sweep angle of this subsonic leading edge can vary in accordance with cruise Mach number and possibly other design factors.

In this first embodiment of the present invention, as shown in FIG. 2, the outboard wing sections 130 are (or may be) substantially the same in overall design as the outboard wing portions 30 of the airplane 10 of FIG. 1. Thus, as shown in FIG. 2, there are leading edge slats or flaps 134 which are (or may be) droop nose flaps or some other leading edge device, and this less swept leading edge 32 is quite sharp. However, the airplane 110 of the first embodiment of the present invention differs significantly from the airplane 10 of FIG. 1 with regard to the design and operation of the inboard wing sections 126.

In the first embodiment of FIG. 2, the leading edge portions 128 of the inboard wing sections 126 are devoid of mechanical high lift devices and thus comprise stationary outer skin structure. Boundary layer control suction is provided through a perforated suction surface along a narrow strip 136 extending from the most forward leading edge location 138 rearwardly to a juncture line 140 where the inboard leading edge portion 128 joins to the outboard leading edge portion 132. It can be seen from FIG. 3, that the forward lengthwise edge 142 of the boundary layer suction strip 136 is located at (or closely adjacent to) the planform "highlight" of the airplane 126. (The term "highlight" refers to the perimeter edge line of the airplane 110 as seen in top plan view of the airplane.) The rear lengthwise edge 144 of the suction strip 136 is positioned a short distance aft of the forward line 142 and is located at a forward portion of the upper wing surface 146.

The means to apply the suction to the suction strip 136 is shown somewhat schematically in FIG. 3 where there is shown a pump means 147 to create the suction, and a plenum chamber 148 positioned on the inside surface of the suction strip 136 into which the outside air is drawn. In the description of the second embodiment of FIGS. 6 through 8, the suction system for the second embodiment is discussed somewhat more completely. It is apparent that appropriate components from this second embodiment, such as a suction pump, valves and ducts (as well as other components known in the prior art) can be utilized in this first embodiment to create the suction through this strip 136 and control the operation of the same.

Figure 5:
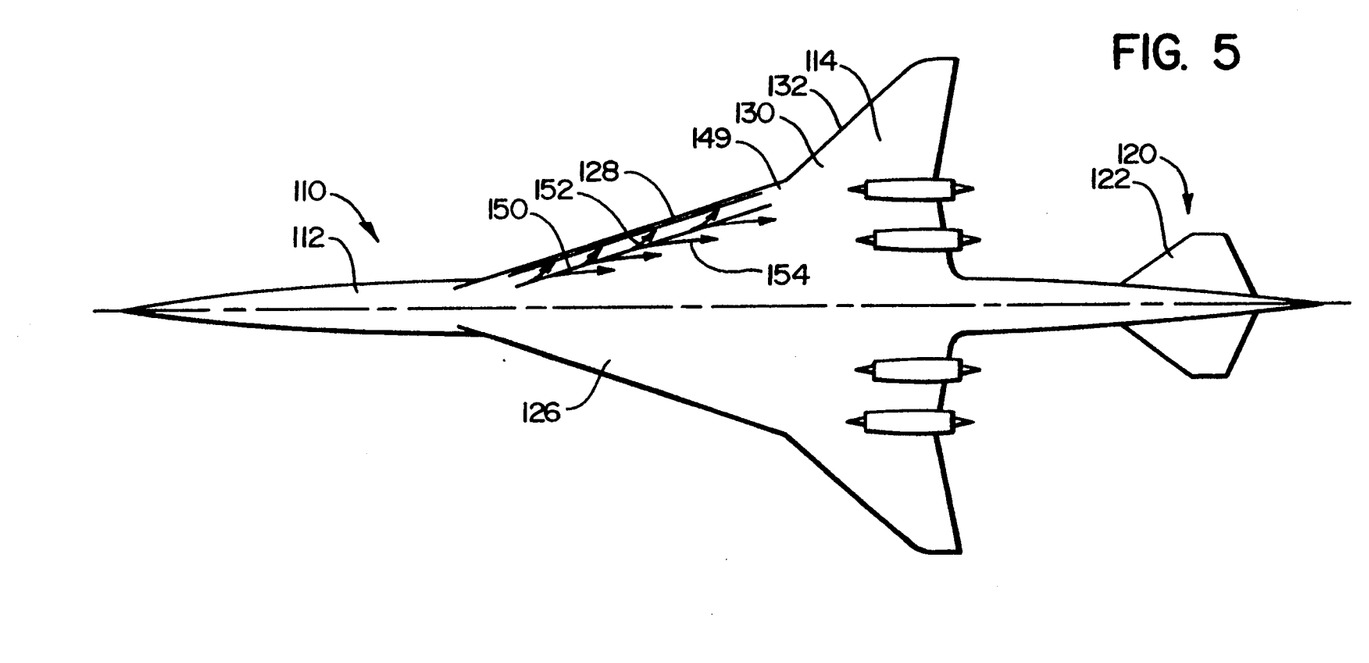
FIG. 5 is a bottom plan view of the airplane of the first embodiment shown in FIGS. 2 through 4.

To describe the operation of the first embodiment shown in FIGS. 2 through 5, let us first consider the operation of the aircraft 110 during takeoff and initial climb. As the airplane 110 gains speed on the runway and rotates to a higher angle of attack to accomplish liftoff and then continues through initial climb, the plane 110 is at a relatively high angle of attack. (e.g. typically ten to fourteen degrees). At this high angle of attack, as shown in FIG. 5 which is a bottom plan view, the airflow along the bottom wing surface 149 adjacent to each leading edge 128 follows an attachment line 150 that is inboard of the leading edge 128. The flow 152 outboard of this attachment line 150 flows rearwardly and outwardly around the leading edge 128 and then upwardly. The flow 154 inboard of the attachment line 150 continues to flow rearwardly along the bottom surface 148.

The flow 152 that travels upwardly and around the leading edge 128 will tend to separate and develop into a strong vortex sweeping over the upper surface of the wing 114. However, when there is sufficient suction applied through the strip 136, this flow separation will be prevented and this vortex will be suppressed so as to substantially diminish drag.

It would be helpful at this point to make at least one distinction relative to suction laminar flow control and suction boundary layer control which is arranged to prevent or inhibit separated flow and thus promote attached flow. The suction coefficient for laminar flow control is typically quite small, in the order of 0.0005. On the other hand the suction coefficient for boundary layer control to prevent separated flow has a suction coefficient which could be, for example, twenty to forty times as great as the suction coefficient for laminar flow control. This will be discussed more completely later herein in connection with the description of the second embodiment where both suction boundary layer control (which could more properly be called "suction separated flow control") and suction laminar flow control are used in conjunction with one another.

The suction through the two vortex strips 136 is accomplished as follows. During takeoff and the start of climb, no suction is applied through the strips 136 (or at most a small amount of suction) so that two strong vortices are able to develop at the inboard portions of the wings 114 and travel rearwardly over the upper wing surfaces. As indicated before, in a highly swept wing, these two vortices produce substantial lift, with the drawback being that because of the large amount of drag developed, greater power is demanded from the engines 118. However, when the plane 110 is taking off or at very low altitude, the greater noise developed by the increased thrust would be at acceptable levels for the immediate airport vicinity. As the airplane 110 continues to climb, however, it would be expected to be traveling over areas where the noise generated by the higher engine power settings would be found environmentally objectionable. At this time, the suction boundary layer control would be activated to suck in sufficient air flowing over the leading edges 128 to substantially eliminate (or alleviate) the effect of the vortices to substantially reduce drag. At the same time, the power setting of the engines 118 would be lowered so that less noise would be generated. Yet the airplane would be able to maintain an angle of attack sufficient to develop enough lift to continue climb.

It is to be understood, of course, that the activation of the suction through the boundary layer strips 136 could be programmed to optimize performance. Thus, during liftoff, there may be no application of suction through the strips 136, and this could be increased on a schedule as the airplane approaches altitude where community noise becomes an issue. Also, as the airplane 110 continues through climb and the angle of attack becomes somewhat less, the suction through the boundary layer control strips 136 could be diminished further or even shut off totally. In general during subsonic climb, the boundary layer control mode of operation would continue until the airplane 110 is away from geographical areas where excessive noise from the aircraft would be objectionable.

An analysis of the performance of an airplane 110 incorporating the present invention was made relative to the airplane design as illustrated in FIG. 1. This analysis indicates that when the lift over drag (L/D) is plotted against the lift coefficient during conditions of climb out where there is a relatively high power setting, the airplane 110 of the first embodiment of the present invention shows an improved L/D over that shown in FIG. 1.

Analysis also indicates that for an angle of attack that would be typical during climb-out, under conditions where the boundary layer control mechanism is off, as compared to when the boundary layer control mechanism is operating, there will an increase in pitching moment which would need to be offset. (The boundary layer control turning off would be under circumstances where there is a possible malfunction of the BLC system.) However, the horizontal stabilizer, which is sized for takeoff rotation and stall recovery requirements has ample control authority to counteract the pitching moment increment resulting from accidental loss of boundary layer control suction during climbout.

In the event of an accidental loss of boundary layer control suction at the highly swept inboard wing leading edge, analysis indicates that the net lift on the configuration would increase somewhat because of the transition from attached flow to vortex lift mode. This is in sharp contract to the behavior of low sweep (20°-35° leading edge sweep typical of subsonic transport airplanes) wings where loss of leading edge boundary layer control (if implemented) would result in a dramatic loss of lift and deep stall. For this reason, implementation of BLC on low sweep wings raises serious safety concerns which are not relevant in the present highly swept wing application.

Overall, the improvements provided by the first embodiment of the present invention are that there is improved lift over drag during climb-out, elimination of systems required to move leading edge devices, weight and cost savings in eliminating the leading edge hardware and systems, and also a gain of fuel volume in the leading edge region. On the other hand, the penalties of the inboard wing leading edge device removal is that there would be a requirement to increase the horizontal tail area a small amount for take-off rotation and stall recovery. Also, there is somewhat reduced lift coefficient during approach at maximum angle of attack for touchdown, this being a consequence of the apex flap removal).

Figures 6, 7:
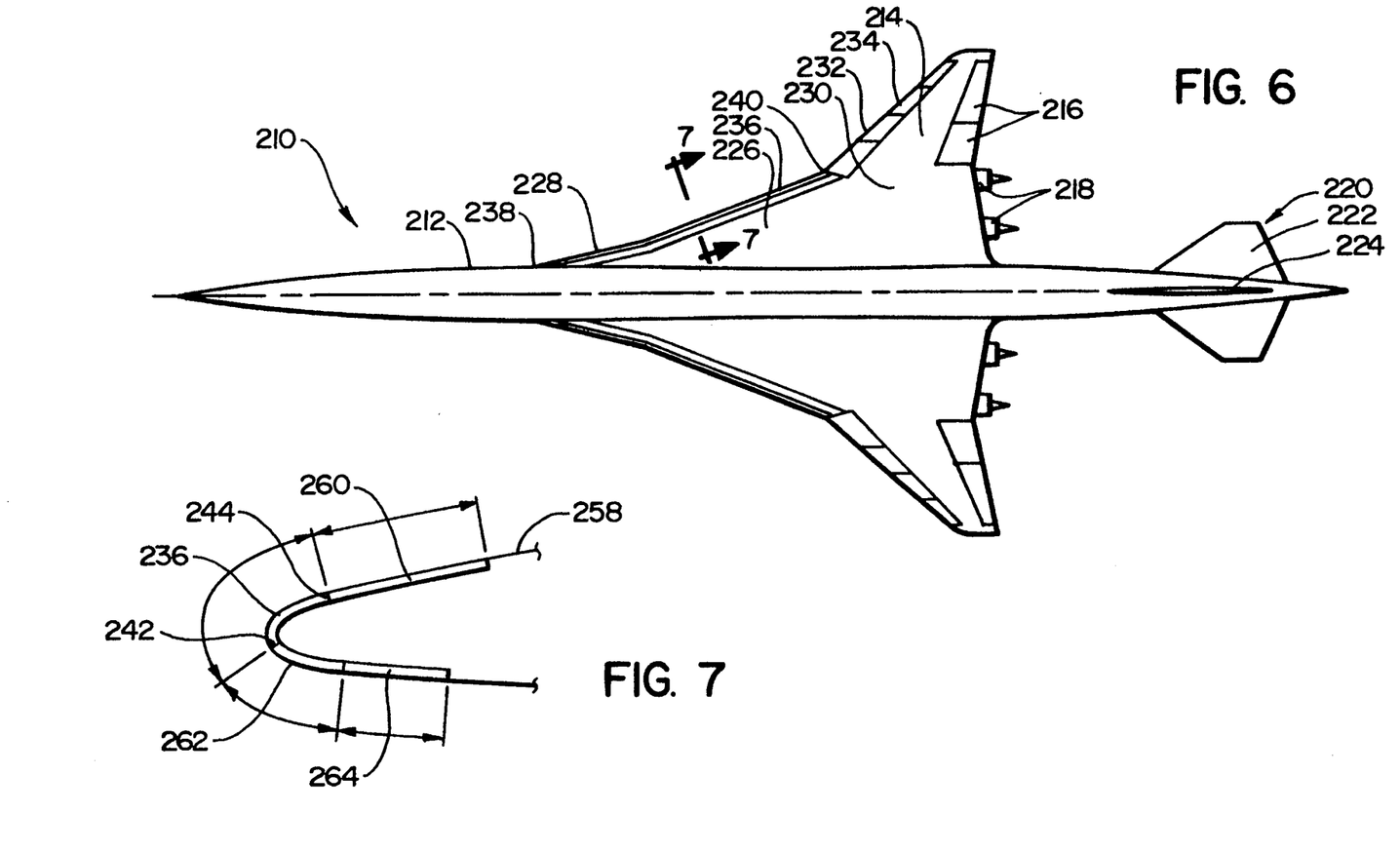
FIG. 6 is a top plan view of a second embodiment of the present invention.
FIG. 7 is a sectional view of the leading edge taken along line 7—7 of FIG. 6.
Figure 8:
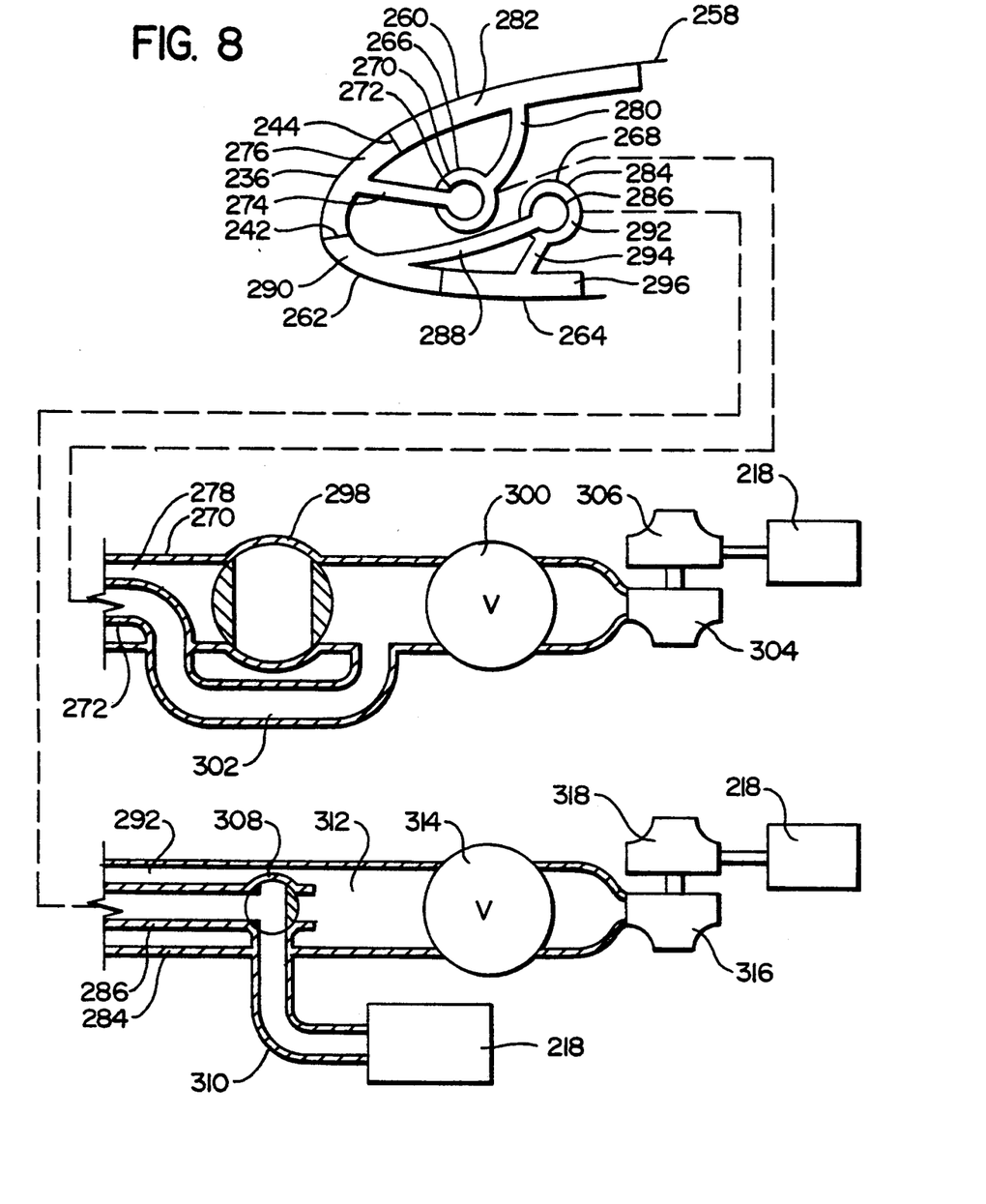
FIG. 8 is a semi-schematic view of the airflow system utilized in the second embodiment.

A second embodiment of the present invention is illustrated in FIGS. 6 through 8. This second embodiment 210 is similar to the first embodiment, except that suction laminar flow control is used in addition to suction boundary layer control. Further, there is added the use of hot air blown outwardly to travel over the leading edge surface for anti-icing.

In FIG. 6, there is shown the airplane 210, having a fuselage 212, wings 214, trailing edge flaps 216, engines 218, and a tail assembly 220 (comprising the horizontal tail section 222 and the vertical fin 224). Also, as in the first embodiment, there is the inboard highly swept inboard wing portion 226 with a leading edge 228, and the outboard less swept wing portion 230, with the leading edge 232. Further, as in the first embodiment, there are the leading edge devices 234 on the outboard leading edges 232.

The additional features of this second embodiment will now be described with initial reference to FIG. 7. It can be seen that as in the first embodiment there is a boundary layer control strip 236 extending from the most forward portion 238 of the leading edge 228 to the juncture location 240 where the leading edge 228 meets the outboard leading edge 232 (see FIG. 6), and having forward and rear edges 242 and 244 (see FIG. 7). In addition, immediately rearwardly of the boundary layer control strip 236 there is at each forward upper wing surface 258 a laminar flow control strip 260. Positioned immediately adjacent to the boundary layer control strip 236 and extending downwardly and rearwardly of the forward edge 242 of the boundary layer control strip 236 is a combination transpiration anti-icing and laminar flow control strip 262. Then adjacent to (and immediately rearwardly of) the strip 262 is a lower laminar flow control strip 264. These strips 236, 260, 262 and 264 extend along the length of the forward leading edges 228 of the wings 214.

To discuss briefly the operation of the various strips described immediately above with reference to FIG. 7, the boundary layer control strip 236 performs substantially the same function as it does in the first embodiment. More specifically, in high lift operation during that portion of climbout when it is desired to have a high L/D, suction is employed through the strips 236 for boundary layer control to substantially eliminate (or substantially alleviate the effect of) the vortex generated off of each highly swept leading edge. However, in addition, when it is desired to use laminar flow control (e.g. during subsonic cruise), the boundary layer control strips 236 can be used in conjunction with the strips 260, 262 and 264 to accomplish laminar flow control.

Yet another function of the leading edge system shown in FIG. 7 is that each strip 262 can also be used for blowing out hot air for transpiration anti-icing. (This concept of using a perforated wing surface for both laminar flow or boundary layer control air by suction, and also for anti-icing by blowing out hot air is described more fully in U.S. Pat. No. 5,114,100, issued May 19, 1992, entitled ANTI-ICING SYSTEM FOR AIRCRAFT naming its inventors K.C. Rudolph and Dezso Georgefalvy, which is incorporated herein by reference.)

FIG. 8 shows schematically the control system for the apparatus of FIG. 7 of this second embodiment. There are shown two concentrically formed ducts 266 and 268. The duct 266 has an outer cylindrical duct portion 270 and an inner concentric cylindrical duct portion 272. The inner duct portion 272 connects through a tube means 274 to a chamber 276 positioned immediately adjacent to the inner surface of the boundary layer control strip 236. The annular area 278 defined by the outer and inner tubes 270 and 272 leads through a tube means 280 to a chamber 282 immediately adjacent to the inner surface of the aforementioned upper laminar flow control strip 260.

The concentric duct 268 comprises an outer duct 284 and an inner duct 286. The inner duct 286 connects through a tube means 288 to a chamber 290 which is immediately adjacent to the inner surface of the anti-icing and laminar flow control strip 262. The annular chamber 292 defined by the inner and outer tubes 286 and 284 connects through a tube means 294 to a plenum chamber 296 immediately adjacent to the inner surface of the lower laminar flow control strip 264.

The annular passageway 278 leads through a first flow control valve 298 to a second control valve 300. The inner tube 274 has a bypass portion 302 which bypasses the valve 298 and leads back into the outer tube 270 at a location between the valves 298 and 300. The suction is supplied by a first suction pump 304 which is driven by a turbine 306 which in turn is powered by the bleed air from one or more of the engines 218.

As indicated above, the strip 262 can function either in the laminar flow control mode where it is sucking in air, or in the transpiration anti-icing mode where it is blowing out hot air. Accordingly, the inner conduit 286 of the conduit 268 leads through a valve 308 which operates in either of two positions. In a first position shown in FIG. 8, the valve 308 directs hot bleed air from one or more of the engines 218 through the tube 310 through the valve 308 and into the inner conduit 286 to pass into the chamber 290 to cause the hot air to pass outwardly through the strip 262. Then this hot air passes from the strip 262 to sweep upwardly and over the surfaces of the strips 236 and 260.

Figure 8A:
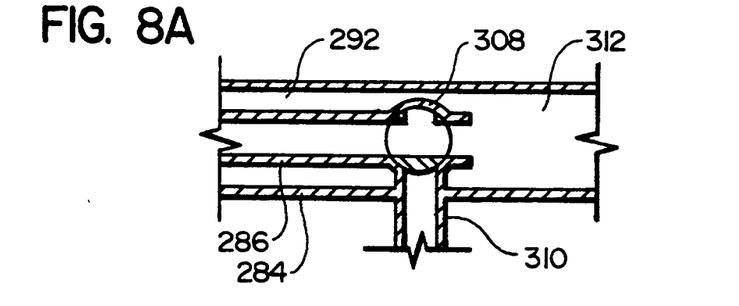
FIG. 8a is a schematic view of one of the valves of the system of FIG. 8 showing the valve in a different operating position.

In the laminar flow control mode, the valve 308 is at the position shown in FIG. 8A where the valve 308 is positioned so that the flow of hot bleed air from the tube 310 is blocked off, and the inner conduit 286 leads directly into the interior area 312 of the outer tube 284. The tube 284 in turn leads to a control valve 314, which in turn leads to a second suction pump 316 driven from a second turbine 318 that is powered by air from one or more of the engines 218.

To describe the operation of this second embodiment 210, during takeoff and initial climb, the boundary layer control flow through the boundary layer control strips 236 is operated in substantially the same manner as indicated in the first embodiment. In this operating mode, the valve 298 would be in its closed position shown in FIG. 8, and the control valve 300 would be operated selectively to control the boundary layer control flow as indicated in the description of the first embodiment. Also, during its takeoff and initial climb, the valve 308 is in the position of FIG. 8A and the valve 314 is closed so that there is no flow through either of the surface strips 262 or 264.

Let it now be assumed that the airplane 210 is traveling from takeoff through initial climb and icing conditions are encountered. At this time, the valve 308 is moved to the position of FIG. 8, and anti-icing bleed air from the engine or engines 218 flows through the tube 310, through the inner conduit 286 and outwardly from the plenum 290 through the strips 236 as anti-icing air. As indicated above, this anti-icing air flows upwardly over the leading edge of the wing and over the upper surface a short distance to prevent the formation of ice on the leading edge portion of the wing.

Figure 8B:
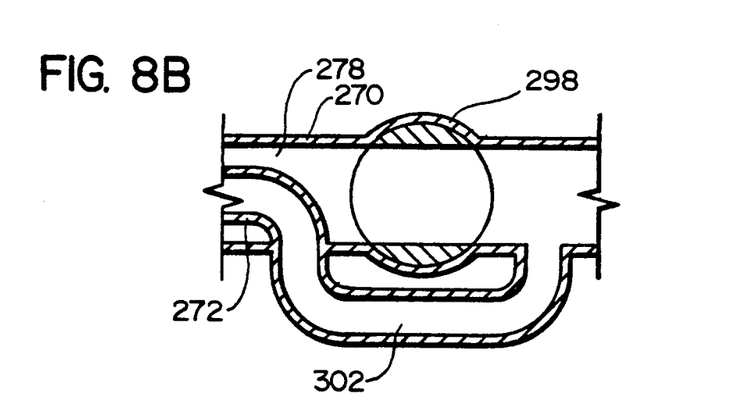
FIG. 8B is a view of another one of the valves of the system of FIG. 8 being shown in another operating position.

Let it now be assumed that the airplane 210 has completed going through the initial portion of its climb and has now reached a velocity in the supersonic range where the laminar flow control may be of benefit. (This would be expected to occur during the latter part of climb through the supersonic range and also at supersonic cruise.) At this time, the valve 298 is moved from its position in FIG. 8 to its position in FIG. 8B, thus opening the annular passageway 278 to the control valve 300. At the same time, the control valve 300 is placed at the appropriate position to create the proper amount of suction for the chambers 276 and 282 to draw in laminar flow control air through the surface strips 236 and 260. At the same time, the valve 308 is moved from the position of FIG. 8 to the position of FIG. 8A, thus shutting off the flow of hot bleed air from the engine 218, and also connecting the inner conduit 286 to the valve 314. Then the valve 314 is set at the appropriate position to create the proper amount of suction to obtain the desired laminar flow control at the surface strips 262 and 264.

It is to be understood, of course, that the suction control system illustrated in FIG. 8 is somewhat schematic, and of course various changes could be made. For example, valves could be added or rearranged to obtain other control characteristics. In one possible arrangement an additional valve could be located in the bypass line 302 so that this flow could be controlled in addition to the control provided by the valve 300, or possibly the valve 300 could be deleted. Similar modifications could be made with regard to the valving at 308 and 314.

Analysis has shown that the flow requirements for boundary layer control (more precisely separation flow control) operation in comparison with laminar flow control operation indicates that the volume fluxes for the two applications are comparable. Thus the sizes of the suction ducts and the compressors in the systems shown in FIG. 8, when designed for laminar flow control mode of operation, should be adequate for the boundary layer control application when only the small boundary layer control strip 236 is used. This analysis is as follows:

Typically the suction coefficient (Cq) for laminar surface flow is equal to approximately 0.0005. On the other hand, the suction coefficient (Cq) for boundary layer control (more precisely flow separation control) is in the order of 0.01 to 0.02. Thus, the suction coefficient is generally twenty to forty times as great for BLC (i.e. flow separation control) as it is for laminar flow control. (The non-dimensional suction coefficient (Cq) is defined as $$\frac{\rho_o v_o}{G_\infty}.$$

On the other hand, it has to be considered that the laminar flow control will commonly be operating during supersonic cruise where the Mach number could be, for example, 2.4 and the altitude of the airplane at 60,000 feet. Further, during supersonic cruise there will be a relatively high surface temperature immediately adjacent to the airplane surfaces. On the other hand the speed during initial subsonic climb would be, for speed during initial subsonic climb would be, for example, Mach 0.3, and the altitude possibly 1,000 feet (depending upon the altitude of the runway). Under these conditions, the free stream mass flux during climb when boundary layer control would be used would be equal to about 1.5 the free stream mass flux at supersonic cruise where laminar flow control would commonly be used. Therefore, the surface mass flux ($\rho_o V_o$) when boundary layer control is applied during takeoff would be thirty to sixty times the surface mass flux during laminar flow control.

Typically, when the pressure temperature and air density at the suction surface is compared for supersonic cruise (where laminar flow control would take place) to the conditions at climb out (where the boundary layer control would take place) is such that the air density at the suction surface during climb out when boundary layer control would be applied would be about twenty times the air density at the suction surface at supersonic cruise where laminar flow control would be applied. From this, it can be concluded that the suction air velocity at the surface under conditions of laminar flow control would be approximately 1.5 to 3 times the velocity during the boundary layer control mode during takeoff. Since the skin pressure drop is proportional to the suction air velocity, the skin pressure drop in the BLC mode would also be 1.5 to 3 times the skin pressure drop in the LFC mode, which is quite acceptable. Thus, from this analysis, it can reasonably be concluded that the suction system that would be utilized for laminar flow control would be adequate for the boundary layer control mode. Other facts to be considered are that the temperature of suction air is somewhat higher during the laminar flow control mode, thus resulting in somewhat higher viscosity and pressure drop for a given volume flux. Also, a higher pressure drop is tolerable in the boundary layer control mode because the external pressure is substantially higher compared to cruise laminar flow control conditions.

The elimination of the variable geometry leading edge devices on the highly swept inboard wing also eliminates potential steps and gaps on the surface which would be unacceptable for maintaining laminar flow. The incorporation of fixed geometry leading edge suction surface on the inboard wing makes it much easier to achieve the surface smoothness requirements to maintain laminar flow.

Figure 9:
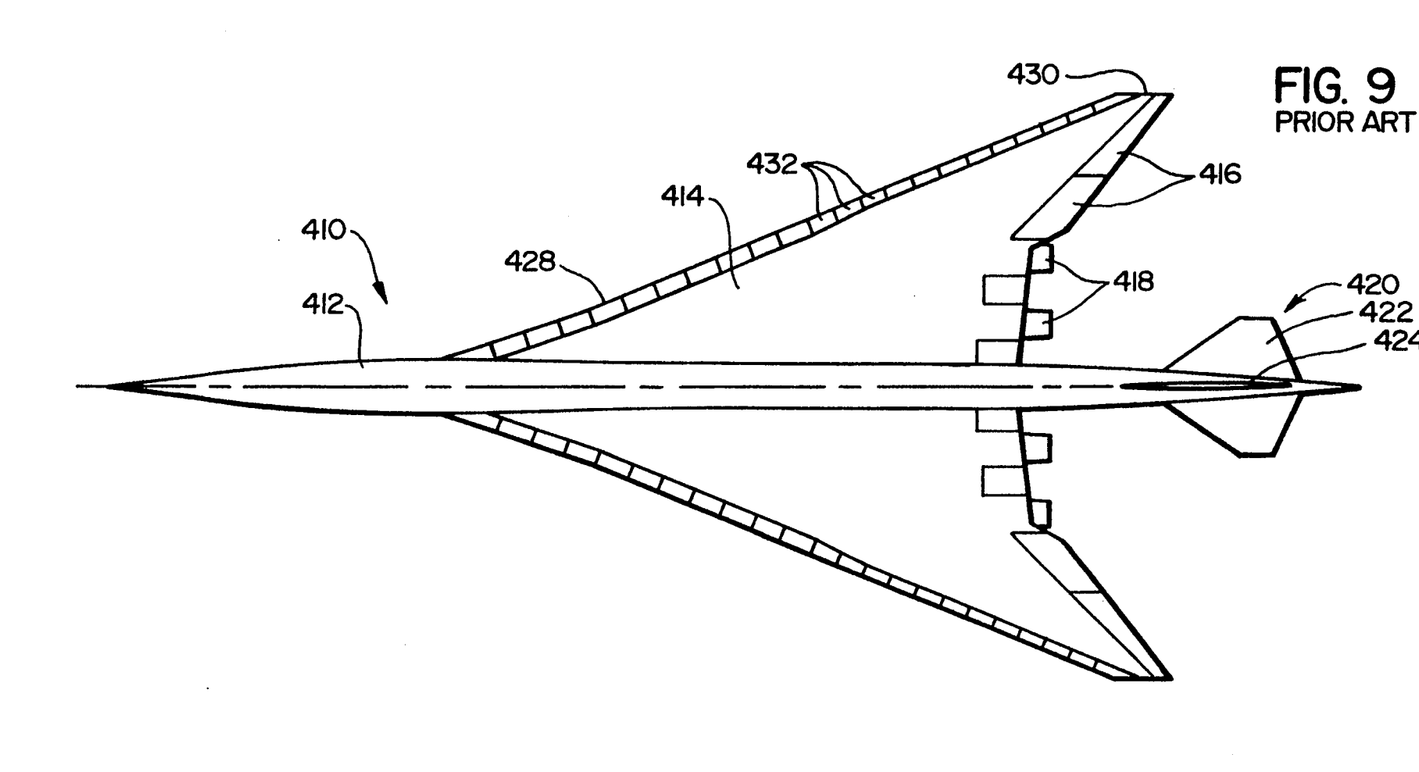
FIG. 9 is a top plan view of a prior art supersonic airplane having an arrow wing configuration.

Before describing a third embodiment of the present invention shown in FIG. 10, reference will first be made to FIG. 9 which is a plan view illustrating another prior art configuration of a supersonic aircraft. This aircraft 410 has the arrow wing configuration, where the entire leading edge of the wing is highly swept. This airplane 410 comprises a fuselage 412, wings 414, trailing edge flaps 416, a plurality of engines 418 and a tail assembly comprising a horizontal tail section 422 and a vertical fin 424.

However, the entire leading edge 428 is a highly swept leading edge extending all the way to the very aft portion of the wing, where there is a relatively short wing tip end section 430 which is parallel to the stream line. The leading edges 428 of the wings 414 are provided with a plurality of leading edge flaps or slats 432.

Figure 10:
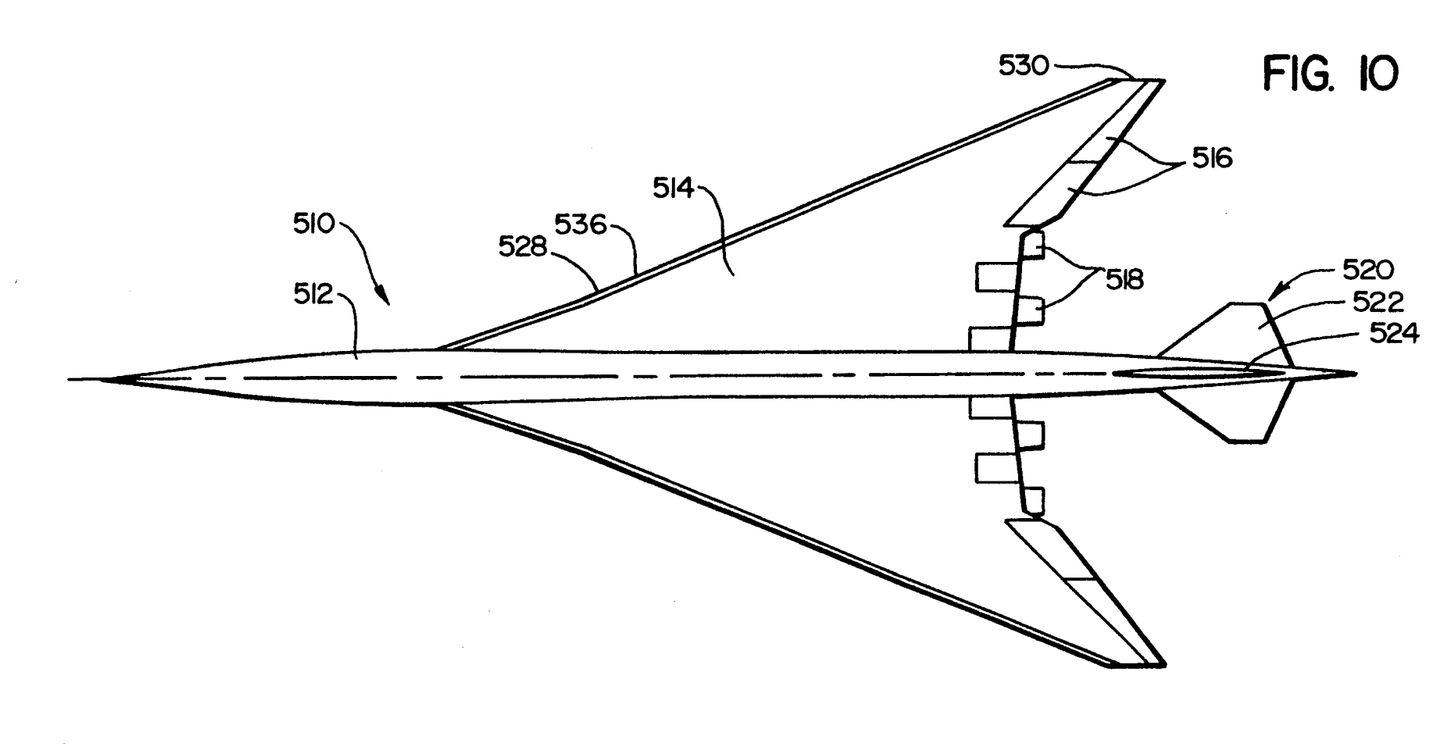
FIG. 10 is a top plan view of a third embodiment of the present invention incorporated with an arrow wing.

FIG. 10 illustrates a third embodiment 510 of the present invention using the arrow wing configuration. This third embodiment 510 of the present invention is substantially similar to the prior art airplane of FIG. 9. Thus there is the fuselage 512, wings 514, trailing edge flaps 516, engines 518 and tail assembly 520–524. There is the highly swept leading edge 528 extending all the way to the wing end tip portion 530. However, instead of having the leading edge flaps 432, there are two boundary layer control suction strips 536 extending the length of the highly swept leading edge in a manner similar to the earlier two embodiments. It is believed that the configuration and mode of operation of this third embodiment is readily understandable from a reading of the description of the first two embodiments. More specifically, the suction boundary layer control is operated during climb to provide a relatively high lift over drag ratio (L/D) while still providing sufficient lift for climb out and alleviating engine noise.

It is apparent of course that this third embodiment 510 could be further modified, for example, to incorporate features of the second embodiment shown in FIGS. 6 through 8. Thus, as in the second embodiment, in addition to using the suction boundary layer control strips 536 (more precisely the flow separation control strips 536), additional suction laminar flow areas could be added.

With regard to various design features of the present invention, the design of the boundary layer control suction areas 236, 336, and 536 is desirably accomplished by utilizing the available technology relative to boundary layer control. Current designs would indicate that the size of the suction openings could be, for example, between 0.002 inch to 0.003 inch, and the spacing of these holes could be between 0.01 inch to 0.025 inch. Present analysis indicates that the width of the boundary layer control strips (taken along a streamline parallel to the longitudinal axis of the airplane) would be between about one percent to two percent of wing chord length. Thus, as the chord length of the airplane decreases in an outboard direction, it would be expected that the width of the boundary layer strips (136, 236 or 536) would decrease accordingly. However, within the broader scope of the present invention, under certain circumstances this width dimension may change to possibly somewhat greater than two percent, possibly as high as four to five percent. Also further analysis may indicate that this two percent dimension of the suction strip 136, 236 or 536 should be higher where the chord length is much shorter.

With regard to the dimensioning of the laminar flow control strip 260 of the second embodiment, present analysis indicates that the total width dimension (i.e. the dimension taken parallel to the longitudinal axis of the airplane) would be about ten percent of chord length. Thus, if the laminar flow control strip 236 is two percent of chord length, then the width of the laminar flow control strip 260 would be approximately eight percent (depending upon specific design considerations) to make a total of ten percent during LFC. Normally, when a laminar flow control is used over, for example, ten percent of the chord length of the wing, the laminar flow will continue over the wing surface up to possibly an additional twenty percent of the chord length. Accordingly, it may be desirable to add yet an additional laminar flow control strip nearer to the mid-span line of each wing to obtain yet additional laminar flow over the wing surface.

With regard to the suction pressure differential from the outside to the inside surface where suction is applied, present analysis indicates that this would normally be between twenty to fifty pounds per square foot pressure differential.

It is to be understood that various modifications could be made to the present invention without departing from the basic teachings thereof.

What is claimed is:

1. A supersonic aircraft comprising:
   a. an airfoil having an upper surface and a highly swept subsonic leading edge portion which is arranged to develop at high angles of attack separated flow that develops into a vortex that travels over the upper surface of the airfoil;
   b. said leading edge portion having an outer surface and having at said outer surface a boundary layer control suction strip means extending along said leading edge portion;
   c. suction means to draw in outside air through said suction strip means; and
   d. said suction means being arranged and said suction strip means being positioned, such that the operation of said suction means to draw in said outside air through said suction strip means alleviates separated air flow so as to alleviate developing of said vortex in a manner to decrease drag caused by said vortex.
   e. said suction strip means eliminating the need for mechanical high lift leading edge devices.

2. The aircraft as recited in claim 1, wherein the outer surface of the leading edge portion is substantially fixed.

3. The aircraft as recited in claim 2, wherein said suction strip means is adjacent to a leading edge area at a perimeter edge line of said airfoil relative to a top plan view of said aircraft.

4. The aircraft as recited in claim 1, wherein said suction strip means is adjacent to a leading edge area at a perimeter edge line of said airfoil relative to a top plan view of said aircraft.

5. The aircraft as recited in claim 1, wherein said airfoil also has a second less swept supersonic leading edge portion.

6. The aircraft as recited in claim 5, wherein said aircraft has a planform double delta configuration where said highly swept subsonic leading edge portion is at a more forward inboard location, and said less swept supersonic leading edge portion is at a rear more outboard location.

7. The aircraft as recited in claim 6, wherein said less swept supersonic leading edge portion has mechanically operable leading edge high lift device means to at least partially alleviate separated flow at high angles of attack.

8. The aircraft as recited in claim 1, wherein said highly swept leading edge portion extends substantially along an entire leading edge of said airfoil.

9. The aircraft as recited in claim 1, wherein there is laminar flow control suction strip means located on a surface area of said airfoil, and said suction means is arranged to draw in outside air also through said laminar flow control suction strip means.

10. The aircraft as recited in claim 1, wherein said boundary layer control suction strip means has a width dimension at at least one region of said highly swept subsonic leading edge portion taken along a line parallel to free stream flow relative to said aircraft, and said width dimension is no greater than about five percent of a chord length of said airfoil.

11. The aircraft as recited in claim 10, wherein said width dimension is between about one percent to five percent of said chord length.

12. The aircraft as recited in claim 11, wherein said width dimension is between about one percent to two percent of said chord length.

13. A method of operating a supersonic aircraft, said method comprising:
   a. providing said aircraft with an airfoil having an upper surface and a highly swept subsonic leading edge portion which is arranged to develop at high angles of attack separated flow that develops into a vortex that travels over the upper surface of the airfoil;

b. providing at an outer surface of said leading edge portion a boundary layer control suction strip means extending along said leading edge portion;

c. maintaining said suction means during a high angle of attack mode of operation in an inoperative mode or at low power settings to enhance separated air flow so as to enhance development of said vortex in a manner to provide adequate lift during one of said take-off mode, initial climb mode and take-off and initial climb;

d. operating said suction means after take-off and initial climb of the aircraft to decrease drag, and reducing thrust of the aircraft to alleviate noise, and yet maintain proper flight of said aircraft.

e. said suction strip means eliminating the need for mechanical high lift leading edge devices.

14. The method as recited in claim 13, wherein the outer surface of the leading edge portion is substantially fixed, and when said suction means is not operated, or operated at lower settings to permit said vortex to be generated, the generation of the vortex is utilized substantially solely at said leading edge portion as a high lift device to create adequate lift for take-off and/or initial climb.

15. The method as recited in claim 14, wherein said suction strip means is adjacent to a leading relative to a top plan view of said aircraft means drawing in boundary layer air at the leading edge high light area of the airfoil.

16. The method as recited in claim 13, wherein said airfoil also has a second less swept supersonic leading edge portion and the aircraft has a plan form double delta configuration where the highly swept subsonic leading edge portion is at a more forward inboard location, and said less swept supersonic leading edge portion is at a rear more outboard location, said method further comprising operating mechanically operable leading edge high lift device means at said second leading edge portion to at least partially alleviate a separated flow at high angles of attack at said less swept leading edge portions.

17. The method as recited in claim 13, wherein said highly swept leading edge portion extends substantially all along entire leading edges of said airfoil, and boundary layer suction is utilized along at least a major portion of said leading edge portion of the airfoil.

18. The method as recited in claim 13, wherein there is laminar flow control suction strip means located at a surface area of said airfoil, said method further comprising operating said suction means to draw in outside air through said laminar flow control suction strip means and also through the boundary layer control suction strip means to accomplish laminar flow over said airfoil.

19. The method as recited in claim 18, wherein said laminar flow control suction strip means is located adjacent to and rearwardly of the boundary layer control suction strip means and said suction means is operated to draw in air so as to accomplish laminar flow by both said boundary layer control suction strip means and said boundary layer control suction strip means.

20. The method as recited in claim 13, further comprising discharging air outwardly through said boundary layer control suction strip means in a manner that the discharged air accomplishes anti-icing.

21. A supersonic aircraft comprising:
a. an airfoil having an upper surface and a highly swept subsonic leading edge portion which is arranged to develop at high angles of attack separated flow that develops into a vortex that travels over the upper surface of the airfoil;

b. said leading edge portion having an outer surface and having at said outer surface a boundary layer control suction strip means extending along said leading edge portion;

c. suction means to draw in outside air through said suction strip means;

d. said suction means and said suction strip means being positioned, configured and arranged in a manner that operation of said suction means to draw in said outside air through said suction strip means alleviates separated air flow so as to alleviate developing of said vortex; and e. laminar flow control suction strip means located on a surface area of said airfoil, said suction means being arranged to draw in outside air also through said laminar flow control suction strip means, said laminar flow control suction strip means being located adjacent to and rearwardly of said boundary layer control suction strip means.

22. The aircraft as recited in claim 21, wherein said suction means is arranged to operate in a boundary layer control mode to draw in sufficient outside air through said boundary layer control suction strip means to alleviate said separated flow, and also to operate in a laminar flow control mode and draw in outside air through both of said boundary layer control suction strip means and through said laminar flow control suction strip means at a flow rate to effect laminar flow control by both said boundary layer control suction strip means and said laminar flow control suction strip means.

23. A supersonic aircraft comprising:
a. an airfoil having an upper surface and a highly swept subsonic leading edge portion which is arranged to develop at high angles of attack separated flow that develops into a vortex that travels over the upper surface of the airfoil;

b. said leading edge portion having an outer surface and having at said outer surface a boundary layer control suction strip means extending along said leading edge portion;

c. suction means to draw in outside air through said suction strip means;

d. said suction means and said suction strip means being positioned, configured and arranged in a manner that operation of said suction means to draw in said outside air through said suction strip means alleviates separated air flow so as to alleviate developing of said vortex; and e. transpiration anti-icing strip means positioned adjacent to said boundary layer control suction strip means in a manner that anti-icing air blown outwardly through said transpiration anti-icing strip means blows over at least said boundary layer control suction strip means for anti-icing thereof.

24. The aircraft as recited in claim 23, wherein said suction means includes means to draw in outside air through said transpiration anti-icing strip means, and there is also anti-icing means to deliver anti-icing air to said transpiration anti-icing strip means.

25. The aircraft as recited claim 24, wherein there is a second laminar flow control suction strip means located rearwardly of said transpiration anti-icing strip means, and said suction means further comprises means to draw outside air through said second laminar flow control suction strip means.

* * * * *